US007275571B1

(12) United States Patent
Mawatari

(10) Patent No.: US 7,275,571 B1
(45) Date of Patent: Oct. 2, 2007

(54) METHOD AND APPARATUS OF LOCATING THE OPTIMUM PEELING AXIS OF A LOG AND THE MAXIMUM RADIUS PORTION THEREOF WITH RESPECT TO THE OPTIMUM PEELING AXIS

(75) Inventor: Kazuhito Mawatari, Aichi (JP)

(73) Assignee: Meinan Machinery Works, Inc., Obu-shi (JP)

( * ) Notice: Subject to any disclaimer, the term of this patent is extended or adjusted under 35 U.S.C. 154(b) by 120 days.

(21) Appl. No.: 11/372,100

(22) Filed: Mar. 10, 2006

(51) Int. Cl.
*B23Q 15/00* (2006.01)
*B23Q 16/00* (2006.01)
*B27B 1/00* (2006.01)

(52) U.S. Cl. ................ 144/357; 144/209.1; 144/215.2; 144/403; 144/408

(58) Field of Classification Search ................ 144/356, 144/357, 382, 394, 403, 404, 408, 209.1, 144/214, 215.2
See application file for complete search history.

(56) References Cited

U.S. PATENT DOCUMENTS 3,842,874 A * 10/1974 Noriyuki et al. ............ 144/357
4,246,940 A * 1/1981 Edwards et al. ......... 144/215.2
4,397,343 A * 8/1983 Fields ..................... 144/215.2
4,965,734 A * 10/1990 Edwards et al. ............ 144/357
4,977,805 A * 12/1990 Corley, III ................... 83/76.8
5,449,030 A 9/1995 Mutsuura et al. ........... 144/357
6,305,448 B1 * 10/2001 Ota et al. ................ 144/215.2
6,412,529 B1 7/2002 Puranen ...................... 144/356

FOREIGN PATENT DOCUMENTS

| | | |
|---|---|---|
| EP | 1 470 903 | 10/2004 |
| JP | 06-293002 | 10/1994 |

* cited by examiner

*Primary Examiner*—Bena Miller
(74) *Attorney, Agent, or Firm*—Armstrong, Kratz, Quintos, Hanson & Brooks, LLP

(57) ABSTRACT

A method for locating an optimum peeling axis of a log and a maximum radius point on peripheral surface of the log with respect to the located optimum peeling axis and an apparatus for practicing the method are disclosed. A plurality of swingable members are provided, each member having a contact surface which is swingable in contact with the peripheral surface of the log thereby to follows the peripheral profile of the log while it is being rotated about its preliminary axis. Angular positions of the contact surfaces are measured with respect to a reference position at a number of angularly spaced positions of the log. On the basis of the measured angular positions of the contact surfaces, radial distances of the log from a plurality of predetermined locations on the optimum peeling axis to selected contact surfaces are computed for comparison such radial distances. The distance having the greatest value is regarded as the maximum radius point of the log.

18 Claims, 13 Drawing Sheets

FIG.11

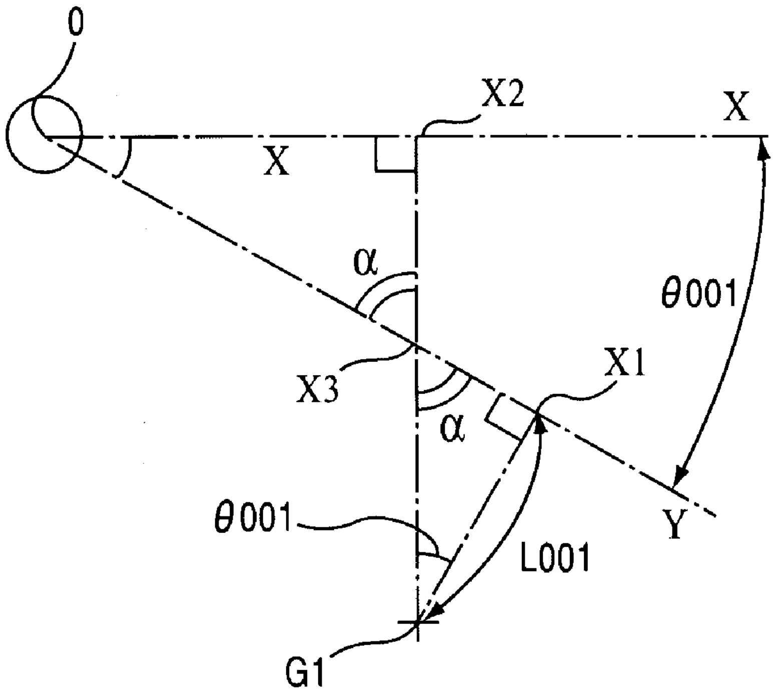

$$\overline{0\cdot X2} = T1 \quad \cdots (1)$$

$$\overline{X2\cdot G1} = T2 \quad \cdots (2)$$

$$\overline{X1\cdot G1} = L001 \quad \cdots (3)$$

$$\overline{X2\cdot X3} = T1 \times \tan\theta001 \quad \cdots (4)$$

$$\overline{X3\cdot G1} = \overline{X2\cdot G1} - \overline{X2\quad X3} \quad \cdots (5)$$

$$= T2 - T1 \times \tan\theta001 \quad \cdots (6)$$

$$\angle X3\cdot G1\cdot X1 = \angle X3\cdot 0\cdot X2 \quad \cdots (7)$$

$$= \theta001 \quad \cdots (8)$$

$$\cos\theta001 = \frac{L001}{\overline{X3\cdot G1}} \quad \cdots (9)$$

$$L001 = \overline{X3\cdot G1} \times \cos\theta001 \quad \cdots (10)$$

$$= (T2 - T1 \times \tan\theta001) \times \cos\theta001 \quad \cdots (11)$$

METHOD AND APPARATUS OF LOCATING THE OPTIMUM PEELING AXIS OF A LOG AND THE MAXIMUM RADIUS PORTION THEREOF WITH RESPECT TO THE OPTIMUM PEELING AXIS

BACKGROUND OF THE INVENTION

The present invention relates to a method of locating the optimum peeling axis of a peeler log for maximum yield in veneer production by a rotary veneer lathe and also locating the maximum radius point of the log's peripheral surface with respect to the located optimum peeling axis. The invention also relates to an apparatus for performing the method.

A typical apparatus for determining the location of the optimum peeling axis of a log and the maximum radius point thereof is disclosed by the Unexamined Japanese Patent Application Publication (or KOKAI Publication) No. H6-293002. This apparatus has a number of log profile detectors which are disposed very close to each other along the entire length of a log for detecting the cross-sectional profiles of the log at many positions thereof along the log length while the log is rotated for a complete turn about its preliminary axis. The location of the optimum peeling axis of the log is determined on the basis of the information of the detected cross-sectional profiles at least two positions. The point on the log peripheral surface having the maximum radius with respect to the located optimum peeling axis is determined based on the information of cross-sectional profiles detected at all positions.

For better understanding of the underlying problem in peeling veneer from a log having an irregular peripheral surface by a rotary veneer lathe, the following will explain briefly the reason why the maximum radius point need to be located. In a rotary veneer lathe for peeling a log for production of veneer, the log supported or held at its opposite ends by lathe spindles is rotated about its longitudinal axis. In peeling veneer from the log, a veneer knife mounted in a movable knife carriage is advanced toward the lathe spindles to cut into the log surface for a distance corresponding to the desired thickness of veneer to be peeled from the log for each complete turn of the log. If the knife carriage is located too far from the lathe spindles and hence the cutting edge of the veneer knife is positioned far from the log periphery just before the peeling operation is started, it takes a long time before the cutting edge of the knife reaches the log peripheral surface and actual veneer peeling begins, with the result that non-cutting downtime is increased and, therefore, the productivity in veneer production is affected thereby. For the veneer knife to cut into the log peripheral surface as soon as possible after it is rotated, the location on the log surface which has the maximum radius point should be determined previously and the knife carriage is positioned accordingly so that the veneer knife cuts into the log surface immediately.

According to the above-identified prior apparatus, however, the calculation procedure for determining the location of the maximum radius point with respect to the optimum peeling axis of the log is complicated and hence a time-consuming sequence.

SUMMARY OF THE INVENTION

An object of the present invention is to provide a method and an apparatus which can solve the drawbacks of the above-described prior art apparatus.

In order to achieve the object, the present invention provides a method of locating an optimum peeling axis of a peeler log and a maximum radius point on peripheral surface of the log with respect to the located optimum peeling axis and also an apparatus for practicing the method. According to the method of the present invention, the peeler log held at its preliminary axis by spindles is rotated for at least one complete turn and, thereafter, an optimum peeling axis of the log is computed on the basis of radial distances of the log from the preliminary axis to the peripheral surface of the log at a plurality of predetermined locations spaced along the preliminary axis of the log at each of a plurality of predetermined angularly spaced positions of the log.

For determining the location of the maximum radius point on peripheral surface of the log with respect to the computed optimum peeling axis, there is provided a plurality of swingable members which are pivotally mounted on a shaft having a longitudinal axis which extends in parallel to the preliminary axis of the log and have flat contact surfaces each having a width extending along the above longitudinal axis. Each contact surface is swingable with the swingable member relative to, or toward and away from, a reference position which is defined by an imaginary plane extending through the preliminary axis and the longitudinal axis, while in contact with the peripheral surface of the log so that the contact surface follows the peripheral profile of the log being rotated about the preliminary axis.

Angular position of the contact surface of each swingable member with respect to the above-defined reference position at each of the predetermined angularly spaced positions of the log is measured by the swingable member. On the basis of the measured angular positions of the contact surfaces, radial distances of the log from a plurality of predetermined locations on the computed optimum peeling axis to selected contact surfaces is computed. Then, the computed radial distances are compared and the distance having the greatest value is recognized as the maximum radius point of the log.

In computing the above radial distances of the log, they may be the distances as measured along imaginary lines extending perpendicularly to the preliminary axis. In the description of the preferred embodiment, a method of figuring out such distances will be explained in detail. Alternatively, the radial distances may be the distances as measured along imaginary lines extending perpendicularly to the computed optimum peeling axis.

In the above method, the predetermined locations on the computed optimum peeling axis correspond to the points of intersection between the optimum peeling axis and respective imaginary planes extending across the log at a side of the width of the contact surfaces in perpendicular relation to the preliminary axis of the log. In this case, angles of any two adjacent contact surfaces with respect to the reference position are compared on the basis of the angular positions of such two adjacent contact surfaces measured at each of the predetermined angularly spaced positions of the log and the above selected contact surfaces include one of the two adjacent contact surfaces whose angle with respect to the reference position is larger than that of the other of the two adjacent contact surfaces.

Alternatively, the above predetermined locations on the computed optimum peeling axis may be the points of intersection between the optimum peeling axis and respective imaginary planes extending across the log at a substantial center of the width of the contact surfaces in perpendicular relation to said preliminary axis of the log.

An apparatus of the present invention for performing the above method includes a pair of spindles for holding therebetween the log at the preliminary axis thereof and a drive such as electrical motor for driving at least one of the paired spindles thereby to rotate the log about the preliminary axis for at least one complete turn. A first sensor is provided for detecting a plurality of angularly spaced positions of at least one of said spindles and hence of the log.

The apparatus further includes a plurality of substantially the same swingable members as those described with reference to the method, a plurality of second sensors arranged at a spaced interval along the preliminary axis of the log for measuring distances from the respective second sensors to the peripheral surface of the log at each of the angularly spaced positions of the log, and a plurality of third sensors operable in conjunction with the above swingable members to measure angular positions of the contact surfaces with respect to the reference position at each of the angularly spaced positions of the log.

There is provided control means in the apparatus which is operable to compute the optimum peeling axis of the log on the basis of the distances measured by the second sensors. The control means is further operable to compute also the above-described radial distances of the log from the predetermined locations on the computed optimum peeling axis to the selected contact surfaces along imaginary lines extending perpendicularly either to said preliminary axis of the log or to the computed optimum peeling axis on the basis of the measured angular positions of the contact surfaces. The computed radial distances are compared and the distance having the greatest value is recognized as the maximum radius point of the log by the control means.

The control means is also operable to compare angles of any two adjacent contact surfaces with respect to the reference position on the basis of the angular positions of such two adjacent contact surfaces measured at each of the predetermined angularly spaced positions of the log so that the radial distance of the log from the predetermined location on the optimum peeling axis to the selected contact surface whose angle with respect to said reference position is larger than that of the other of said two adjacent contact surfaces.

It is to be noted that the method of locating the optimum peeling axis of a peeler log prior to locating the maximum radius point on peripheral surface of the log has been already known in the art and, therefore, it does not form a part of the present invention. However, since the method of locating the maximum radius point can be performed only after the location of the optimum peeling axis has been determined, the following description of a preferred embodiment of the invention will cover the method of locating the optimum peeling axis of a log.

Features and advantages of the present invention will become more apparent to those skilled in the art from the following description of preferred embodiment of the invention, which description is made with reference to the accompanying drawings, wherein:

BRIEF DESCRIPTION OF THE DRAWINGS

FIG. 11 is a schematic diagram and mathematical equations showing a procedure for computing the length L001 of FIG. 9;

DETAILED DESCRIPTION OF THE EMBODIMENT

The following will describe a preferred embodiment of a method of locating the optimum peeling axis of a peeler log having irregularities on the peripheral surface thereof and locating the maximum radius point on the log peripheral surface with respect to the located optimum peeling axis according to the present invention by way of describing an apparatus for performing the method while having reference to the accompanying drawings.

Figure 1:
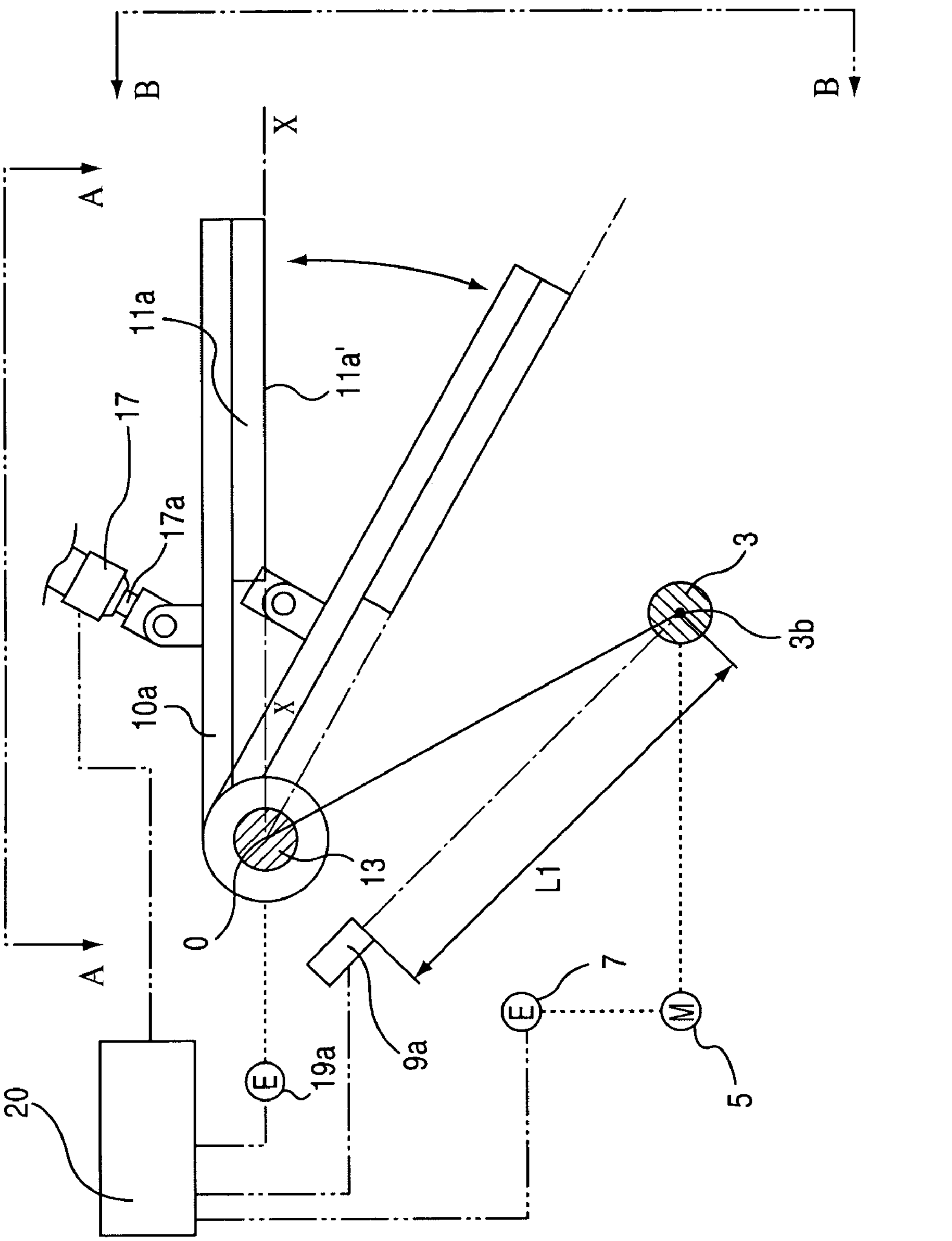
FIG. 1 is a schematic side view of a preferred embodiment of the apparatus according to the present invention.
Figure 2:
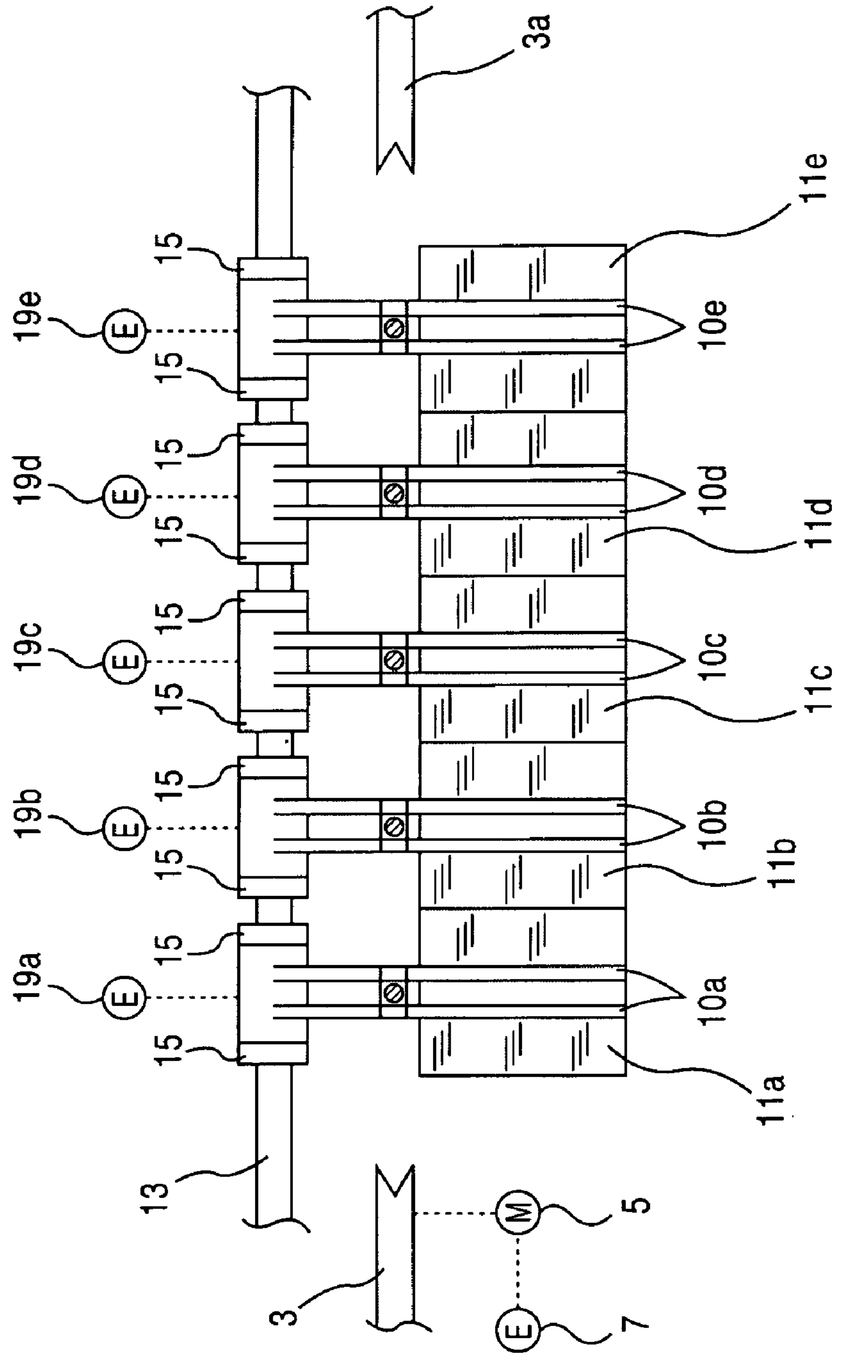
FIG. 2 is a view of the apparatus as seen from line A-A of FIG. 1.
Figure 3:
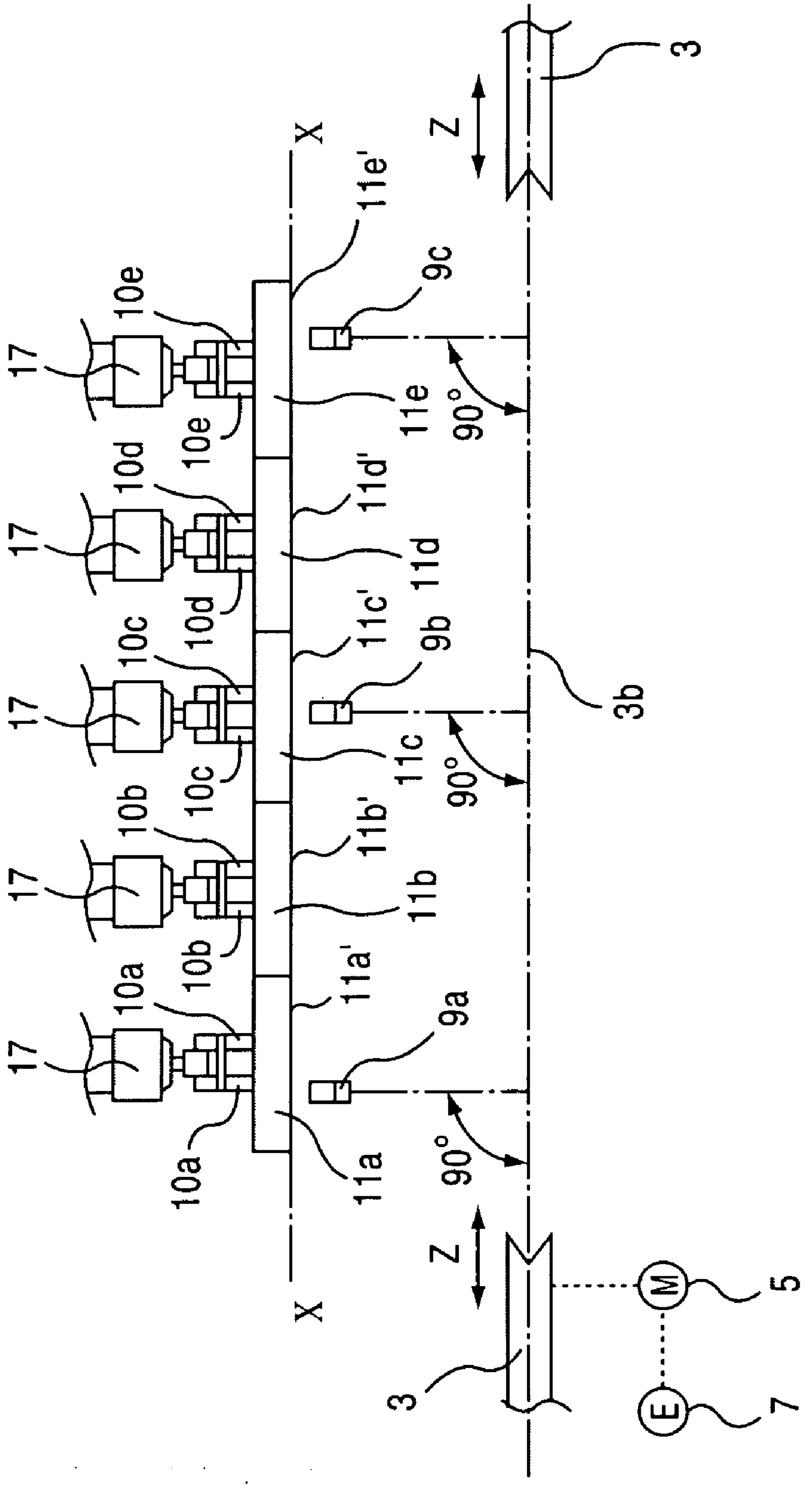
FIG. 3 is a view of the apparatus as seen from line B-B of FIG. 1.
Figure 5:
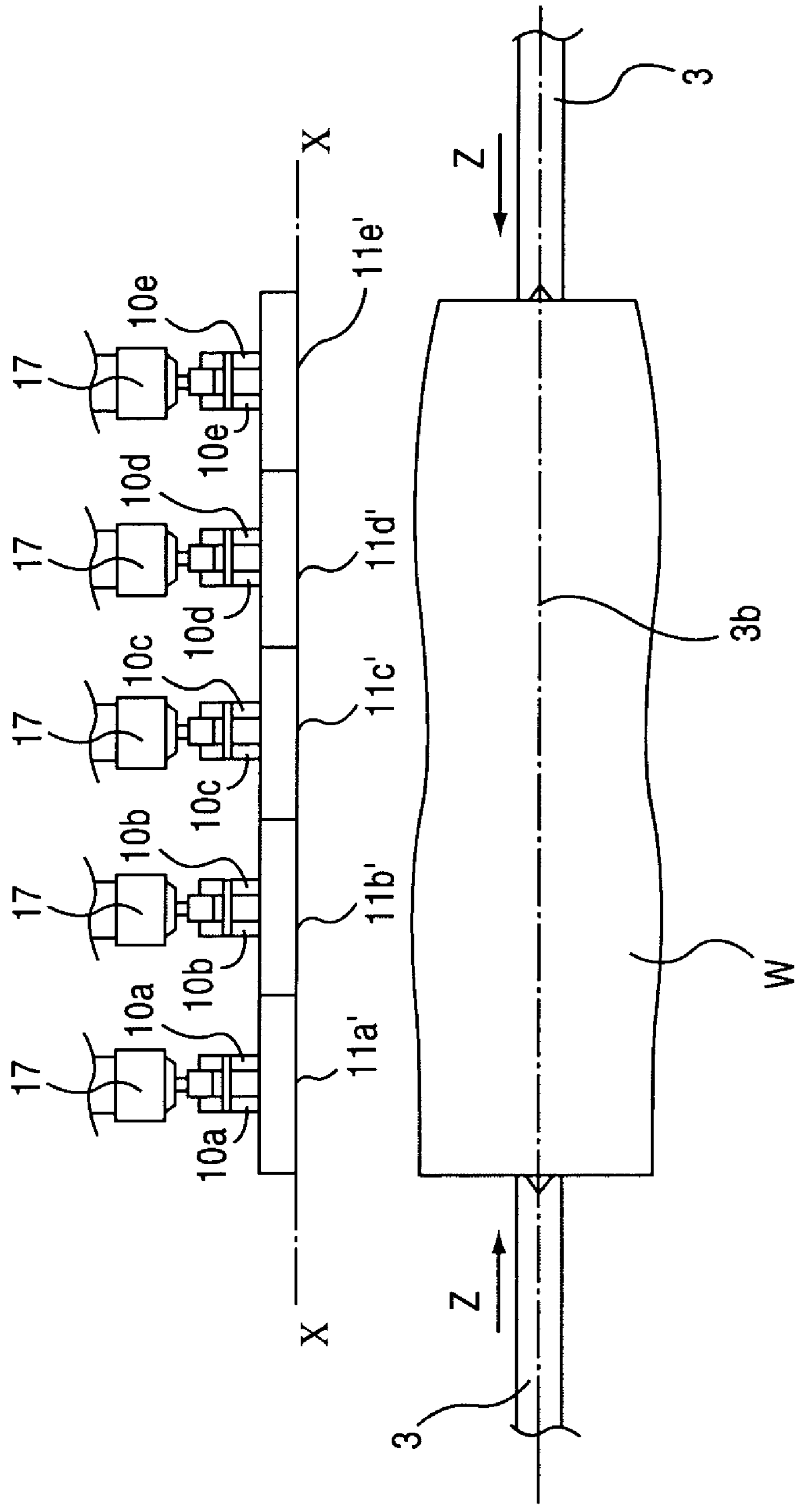
FIG. 5 is a view similar to FIG. 4, but showing the log held by the spindles.

Referring to FIGS. 1 through 3, the apparatus has a pair of spindles 3 which are mounted rotatably in the frame (not shown) of the apparatus. The spindles 3 are movable toward and away from each other as indicated by arrows Z for holding therebetween a peeler log W (shown, e.g. in FIG. 5) at a preliminary axis thereof which corresponds to the aligned longitudinal axes 3*b* of the paired spindles 3. The servo motor 5 is operatively connected to at least one of the spindles 3 so that the log W is driven to rotate by the spindles. The servo motor 5 is also connected to a rotary encoder 7 which is operable to monitor and determine angular positions of the spindles 3 connected to the servo motor 5 and hence angular positions of the log W in rotation and then to generate to a control unit 20 electrical signals indicative of the angular position of the log W. For the sake of the description hereafter, the reference symbol 3*b* for the aligned longitudinal axes of the paired spindles 3 shall also refers to an imaginary longitudinal axial line connecting the aligned axes of the spindles 3 and further to the preliminary axis of the log W as shown in FIGS. 3 and 5.

The apparatus further has three laser-operated devices 9*a*, 9*b*, 9*c* which are provided at locations spaced along the longitudinal axial line 3*b* as shown in FIGS. 1 and 3. Specifically, the laser devices 9*a* and 9*c* are located adjacently to the respective longitudinal ends of the log W when it is held between the spindles 3 and the laser device 9*b* is located between the two laser devices 9*a* and 9*c*. As shown in FIG. 1, the laser devices 9*a*, 9*b*, 9*c* (only the device 9*a* being shown in the drawing) are spaced away from the longitudinal axial line 3*b* at a predetermined distance L1. Each laser device 9*a*, 9*b*, 9*c* has a light source for emitting a laser beam toward the longitudinal axial line 3*b* and a light receiver for receiving a laser beam reflected from the outer peripheral surface of the log W then held by the spindles 3, thereby to measure the distances L2 (shown in FIG. 6) between the laser device 9*a*, 9*b*, 9*c* and a peripheral point of the log surface from which the laser beam has been reflected.

These distance measuring laser devices 9*a*, 9*b*, 9*c* are connected to the control unit 20 and provide information of the measured distances L2 to the control unit 20 which is operable to compute or figure out radial distances of the log W between the longitudinal axial line 3*b* and the peripheral points of the log surface by subtracting the measured distances L2 from the predetermined distance L1. Repeating such calculation on the basis of distance measurements at a number of angularly spaced positions of the log W, the control unit 20 computes to determine the peripheral profiles of the log W, as will be described in later part hereof.

The apparatus further has a number of swing arms. For the sake of simplified illustration and description of the embodiment, five swing arms 10*a*, 10*b*, 10*c*, 10*d*, 10*e* are shown, e.g. in FIGS. 2 and 3, which are juxtaposed at a predetermined spaced interval on a support shaft 13 fixedly mounted to the frame (not shown) of the apparatus and having a longitudinal axis O extending in parallel to the longitudinal axial line 3*b*, as shown in FIG. 1. The arms 10*a*, 10*b*, 10*c*, 10*d*, 10*e* are pivotally mounted on the support shaft for swinging about the axis O. The swing arms 10*a*, 10*b*, 10*c*, 10*d*, 10*e* have fixedly attached thereto contact plates 11*a*, 11*b*, 11*c*, 11*d*, 11*e* which have flat contact surfaces 11*a*', 11*b*', 11*c*', 11*d*', 11*e*', respectively, extending in parallel to the axis O of the arm support shaft 13 and contactable with the peripheral surface of a log W held between the spindles 3. As shown in FIG. 3, the contact surfaces 11*a*', 11*b*', 11*c*', 11*d*', 11*e*' of the contact plates 11*a*, 11*b*, 11*c*, 11*d*, 11*e* have substantially the same width extending along the axis O of the support shaft 13. Suitable spacers 15 are provided on the arm support shaft 13 for positioning the swing arms 10*a*, 10*b*, 10*c*, 10*d*, 10*e* such that the contact plates 11*a*, 11*b*, 11*c*, 11*d*, 11*e* are disposed as close to each other as possible while ensuring uninterrupted swinging motion of the arms without interfering with each other.

As shown in FIGS. 1 and 3, each swing arm 10*a*, 10*b*, 10*c*, 10*d*, 10*e* is connected to a piston rod 17*a* of an air-operated cylinder 17 whose end opposite to the piston rod 17*a* is rotatably mounted to the frame (not shown) of the apparatus so that extending and retracting movement of the piston rod 17*a* of the air cylinder 17 causes its associated arm to swing as indicated by double-headed arrow in FIG. 1. With the piston rod 17 fully retracted in the air cylinder 17, each swing arm 10*a*, 10*b*, 10*c*, 10*d*, 10*e* is placed in its standby position where the contact surface 11*a*', 11*b*', 11*c*', 11*d*', 11*e*' of its contact plate 11*a*, 11*b*, 11*c*, 11*d*, 11*e* lies in an imaginary horizontal plane X-X which passes through the axis O of the support shaft 13, as shown in FIGS. 1 and 3. The piston rod 17*a* of each air cylinder 17 has a length that is large enough for the contact surface 11*a*', 11*b*', 11*c*', 11*d*', 11*e*' of the contact plate 11*a*, 11*b*, 11*c*, 11*d*, 11*e* to follow the peripheral profile of a log W supported between the spindles 3 while in contact therewith when the log W is rotated about its preliminary axis 3*b* with air pressure continued to be applied to the piston rod 17*a* for extension thereof.

It is noted that the above standby position X-X of the swing arm 10*a*, 10*b*, 10*c*, 10*d*, 10*e* is merely an arbitrary position which is angularly spaced from an imaginary plane extending through the preliminary axis 3*b* and the longitudinal axis O at an angular distance that is large enough for the contact plate to be clear of a log W held between the spindles 3 and that the imaginary plane passing through the preliminary axis 3*b* and the longitudinal axis O is a reference position of the apparatus.

Each swing arm 10*a*, 10*b*, 10*c*, 10*d*, 10*e* is operatively connected to a rotary encoder 19*a*, 19*b*, 19*c*, 19*d*, 19*e*, as shown in FIGS. 1 and 2, which is operable to monitor and measure angular positions of each swing arm 10*a*, 10*b*, 10*c*, 10*d*, 10*e* and then to transmit to the control unit 20 electrical signals that are representative of the measured angular positions of the swing arm. According to the present invention, the angular positions of the swing arms 10*a*, 10*b*, 10*c*, 10*d*, 10*e* and hence of the contact surfaces 11*a*', 11*b*', 11*c*', 11*d*', 11*e*' are determinable with respect to the above-defined reference position. For the sake of simplified computation as will be appreciated later, however, it is assumed that the rotary encoders 19*a*, 19*b*, 19*c*, 19*d*, 19*e* are operable to measure angular positions of the contact surfaces with respect to the reference position by determining the angular position with respect to the aforementioned standby position defined by the horizontal plane X-X.

The angular position of each contact surface which follows an irregular peripheral profile of the log W in contact therewith is varied as the log W is rotated about its preliminary axis 3*b* and the contact surface is swung reciprocally up and down according to the irregularities of the log peripheral surface. Based on information provided by the respective rotary encoders 19*a*, 19*b*, 19*c*, 19*d*, 19*e* about the angular positions of the contact surface 11*a*', 11*b*', 11*c*', 11*d*', 11*e*', the control unit 20 is operable to compute to figure out angles θ (shown FIG. 6) which the contact surfaces 11*a*', 11*b*', 11*c*', 11*d*', 11*e*' have swung from the standby position during the rotation of the log W. Alternatively, the control unit 20 is operable to figure out an angle made between the contact surface and the reference position defined by the imaginary plane passing through the axes 3*b* and O on the basis of the same information.

Receiving information from the distance measuring devices 9*a*, 9*b*, 9*c* and the rotary encoders 7, 19*a*, 19*b*, 19*c*, 19*d*, 19*e*, the control unit 20 is also operable to generate various control or command signals for controlling the operation of the servo motor 5 and cylinders 17 and also to compute the optimum peeling axis of the peeler log W and the maximum radius point of the log's peripheral surface with respect to the computed optimum peeling axis, as will be described in detail below.

The following will explain the operation of the above-described apparatus for determining the location of an optimum peeling axis and determining the location of a maximum radius point on peripheral surface of a log with respect to the located optimum peeling axis.

Figure 4:
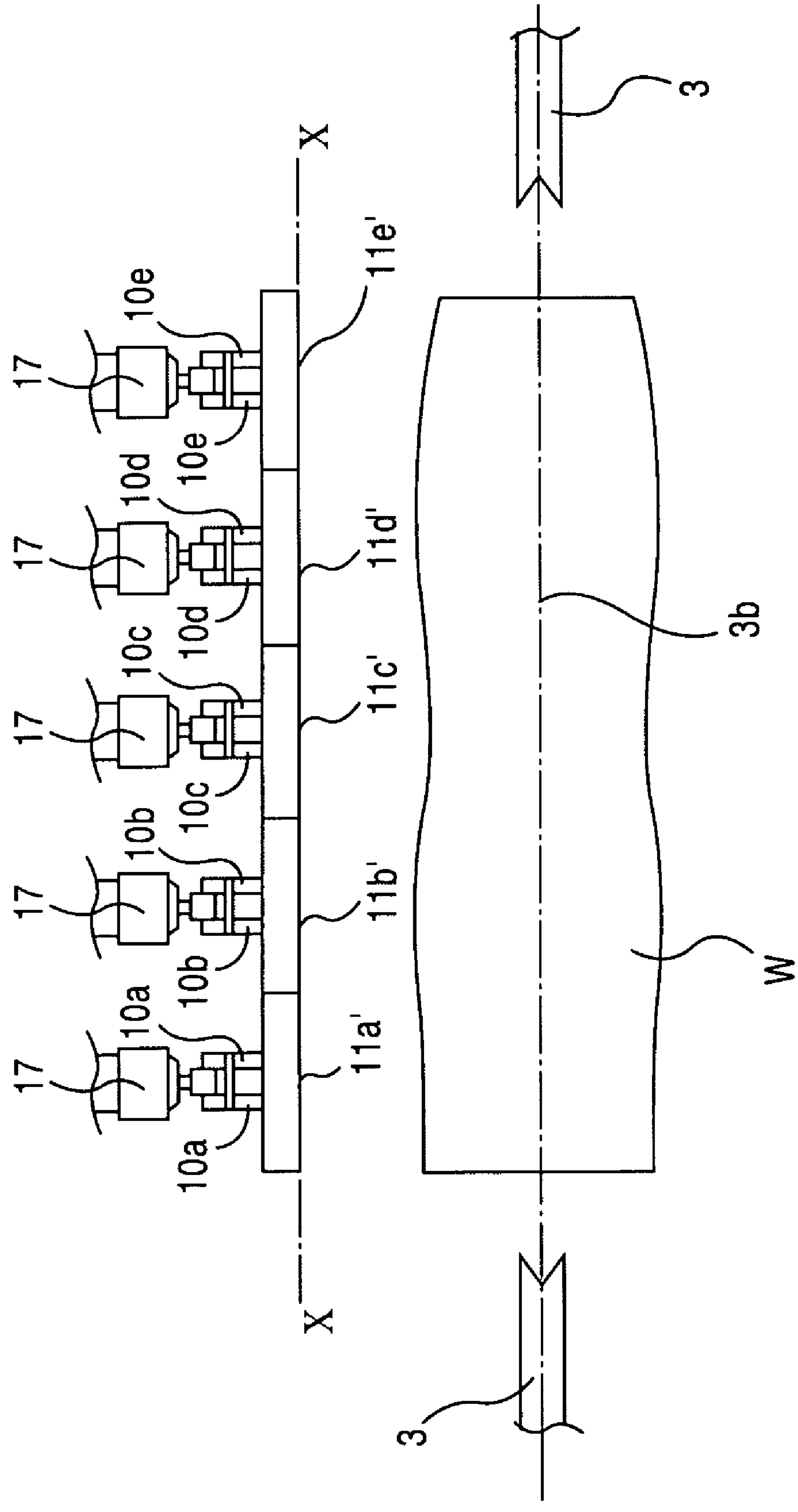
FIG. 4 is a view similar to FIG. 3, but showing a peeler log between a pair of spindles.

In the initial state of the apparatus, the piston rods 17*a* are fully retracted in the cylinders 17, so that the swing arms 10*a*, 10*b*, 10*c*, 10*d*, 10*e* are positioned with the contact surfaces 11*a*', 11*b*', 11*c*', 11*d*', 11*e*' of their contact plates 11*a*, 11*b*, 11*c*, 11*d*, 11*e* placed in the horizontal plane X-X, as shown in FIGS. 1 through 3. A peeler log W is brought and set between the spindles 3*b* by any suitable log transporting device, as shown in FIG. 4. Responding to a manual signal provided by machine operator, the control unit 20 generates a command signal which causes the spindles 3 to move toward each other in Z direction thereby to hold or clamp therebetween the peeler log W, as shown in FIG. 5.

Figure 6:
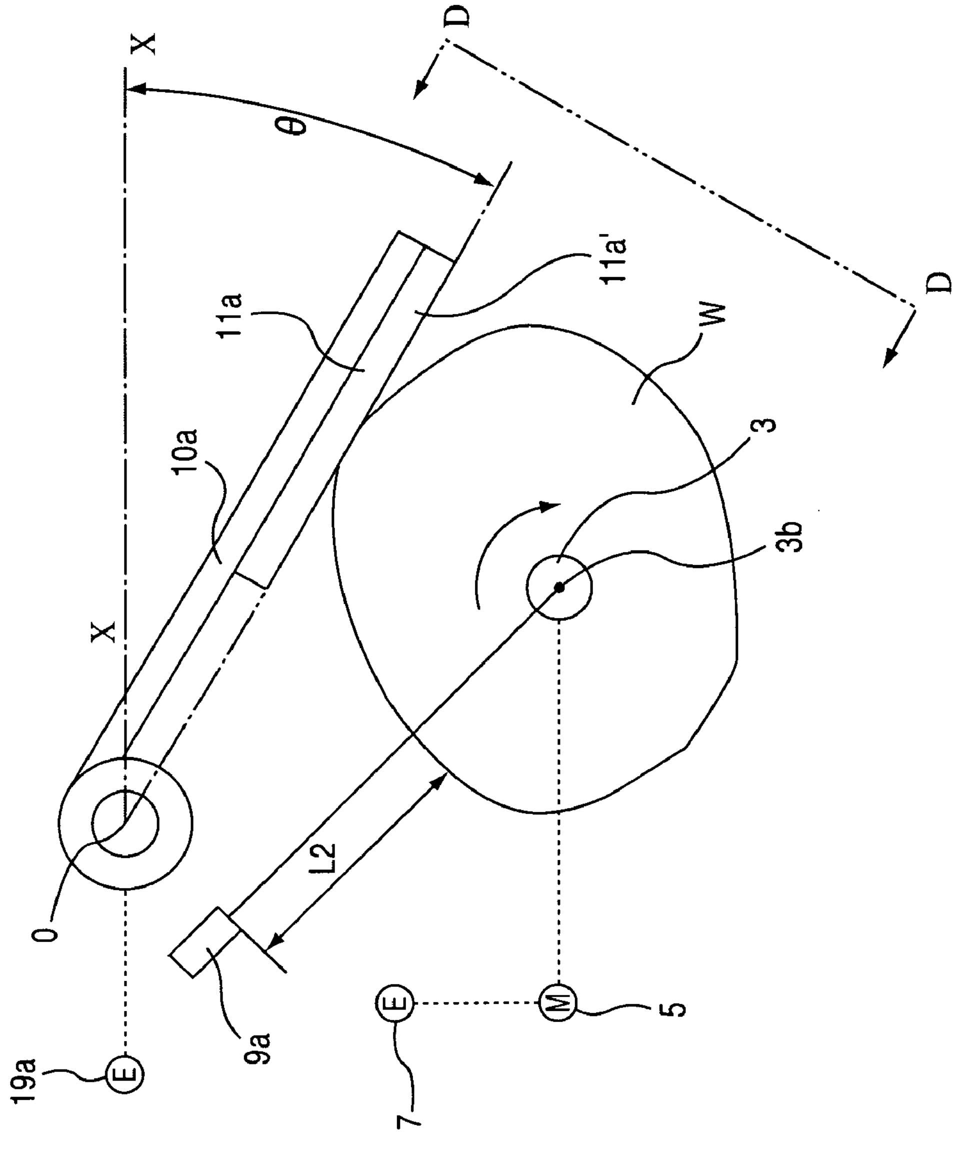
FIG. 6 is a side view showing a contact plate in contact with the peripheral surface of the log.
Figure 7:
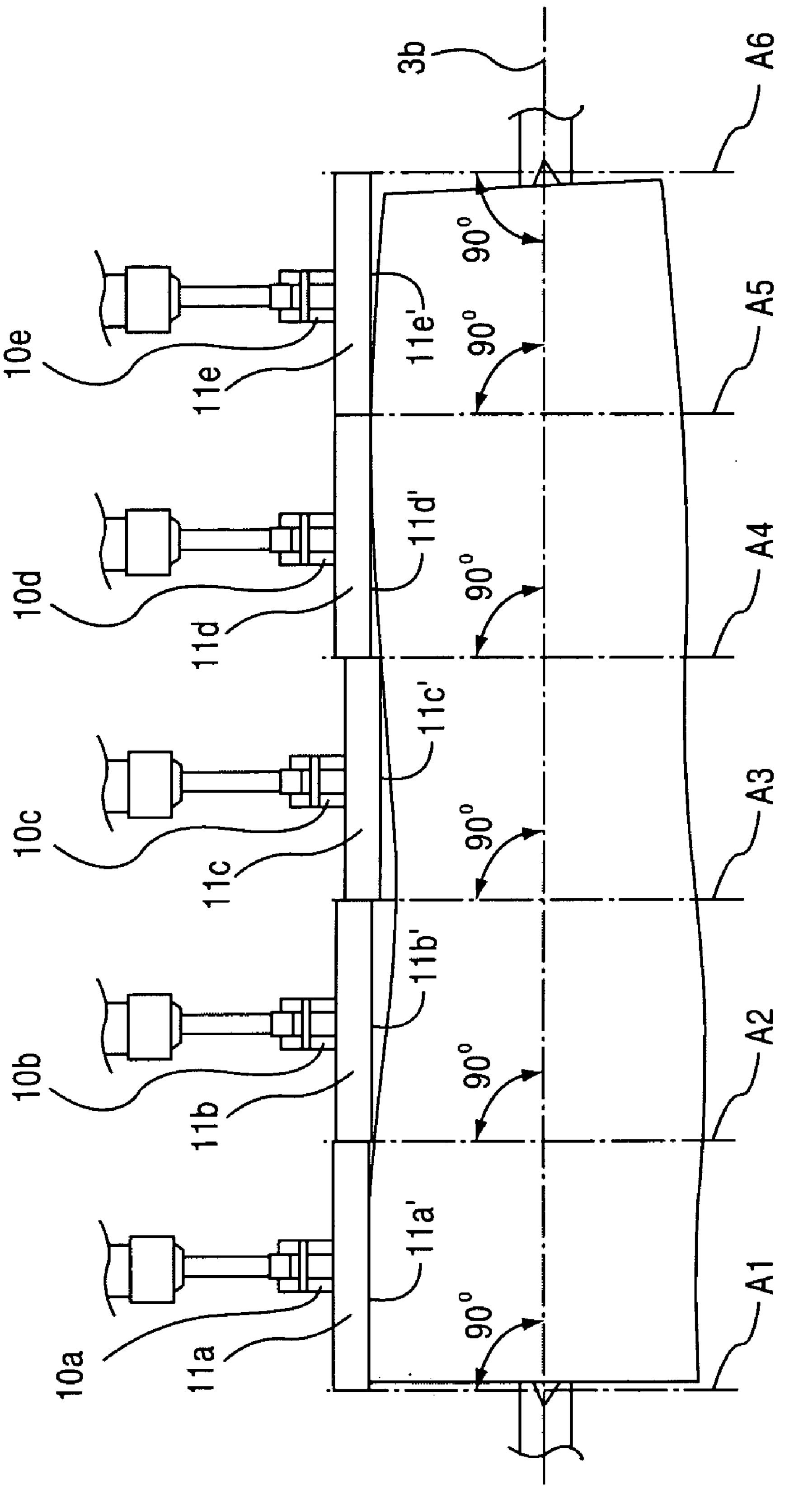
FIG. 7 is a view as seen from line D-D of FIG. 6.

After an elapse of time that is long enough for the log W to be held securely by the spindles 3, the cylinders 17 are activated by application of air pressure thereby to extend their piston rods 17*a*. Accordingly, the arms 10*a*, 10*b*, 10*c*, 10*d*, 10*e* are swung downward about the support shaft 13 until the contact surfaces 11*a*', 11*b*', 11*c*', 11*d*', 11*e*' are brought into contact with the outer peripheral surface of the log W, as shown in FIGS. 6 and 7. After the contact surfaces 11*a*', 11*b*', 11*c*', 11*d*', 11*e*' have moved into contact with the log peripheral surface, the air pressure continues to be applied to the cylinders 17 and the rotary encoders 19*a*, 19*b*, 19*c*, 19*d*, 19*e* make the first measurement of angular positions of the contact surfaces 11*a*', 11*b*', 11*c*', 11*d*', 11*e*'. The rotary encoders 19*a*, 19*b*, 19*c*, 19*d*, 19*e* transmit to the control unit 20 information of the measurement, on the basis of which the control unit 20 figures out the angles θ swung by the respective contact surface 11*a*', 11*b*', 11*c*', 11*d*', 11*e*', i.e. the angle θ then made between the plane X-X and the plane of the contact surface 11*a*', 11*b*', 11*c*', 11*d*', 11*e*', as shown in FIG. 6, or alternatively the angles made between the contact surface and the aforementioned reference position.

After the log W has been held securely by the spindles 3, on the other hand, the distance measuring laser devices 9*a*, 9*b*, 9*c* make the first measurements of the distances L2 and transmit information of the measurements to the control unit 20. As mentioned earlier, the control unit 20 figures out the difference between the distances L1 and L2 thereby to determine the peripheral point on the log surface that is spaced radially from the preliminary axis 3*b* of the log W.

Subsequently, the servo motor 5 is started to rotate the spindles 3 and hence the log W in arrow direction (FIG. 6) for at least one complete turn. During the rotation of the log W, the control unit 20 causes the rotary encoders 19*a*, 19*b*, 19*c*, 19*d*, 19*e* to make measurements of the angular positions of the contact surfaces 11*a*', 11*b*', 11*c*', 11*d*', 11*e*' and the distance measuring laser devices 9*a*, 9*b*, 9*c* to make measurements of the distances L2, respectively, at a number of angularly spaced positions of the log W in increments of a predetermined angle, e.g. 10°. In other words, the measurements by each of the rotary encoders 19*a*, 19*b*, 19*c*, 19*d*, 19*e* and the laser devices 9*a*, 9*b*, 9*c* are made at a number of peripheral points on the log surface which are substantially equiangularly spaced with respect to the preliminary axis 3*b* of the log W, e.g. at 36 different peripheral points in the case of the above increment of 10°. Based on the measurements, the control unit 20 computes to figure out the angles θ swung by the respective contact surfaces 11*a*', 11*b*', 11*c*', 11*d*', 11*e*' and also the locations of the peripheral points on the log surface as measured from the preliminary axis 3*b* of the log W, for each of the above equiangularly spaced peripheral points of the log surface in the same manner as in the case of the above-described first measurements. The information of the angles θ and the locations of the peripheral points are stored in memory of the control unit 20.

After the log W has been rotated for a complete turn, the cylinders 17 are operated so as to retract their piston rods 17*a* thereby to restore the swing arms 10*a*, 10*b*, 10*c*, 10*d*, 10*e* to their original standby positions, as shown in FIG. 1, and the control unit 20 is operated to compute to determine the location of the optimum peeling axis HS of the log W (FIGS. 8 and 9) on the basis of the stored information as follows. Firstly, the control unit 20 computes to determine three irregular polygons each of which is formed by connecting the peripheral points on the log surface figured out previously on the base of the measurements by each of the distance measuring laser devices 9*a*, 9*b*, 9*c*. Then, a maximum inscribed circle of each polygon, i.e. the largest circle which may be included within the confines of each polygon, is computed by the control unit 20. A right cylinder which fits within the three inscribed circles is computed in three-dimensional coordinates with reference to a given point, e.g. on the axis O of the support shaft 13 by the control unit 20, and the cylindrical axis of such right cylinder is determined or recognized as the optimum peeling axis HS of the peeler log W.

During the above rotation of the log W, the contact surfaces 11*a*', 11*b*', 11*c*', 11*d*', 11*e*' follow the peripheral profile of the log W and the swing arms 10*a*, 10*b*, 10*c*, 10*d*, 10*e* make an up-and-down swinging motion, as mentioned earlier. It is assumed that the log W is divided into a plurality of log sections corresponding to the width of the respective contact surfaces 11*a*, 11*b*, 11*c*, 11*d*, 11*e*, as shown in FIG. 7, by imaginary cross-sectional planes A1, A2, A3, A4, A5, A6 which extend radially across the log W in perpendicular relation to the preliminary axis 3*b* of the log W at locations corresponding to a side of the width of each contact surface 11*a*', 11*b*', 11*c*', 11*d*', as indicated by vertical dashed lines in FIG. 7. As appreciated from FIGS. 6 and 7, the angle θ swung by each contact surface 11*a*', 11*b*', 11*c*', 11*d*', 11*e*' is determined by a peripheral point of the log W which projects radially furthest from the axis 3*b* in each of the sections of the log W. However, the exact position of such peripheral point cannot be recognized. For the sake of calculation for determining the location of the maximum radius point of the log W, the swung angles θ for four contact surfaces 11*a*', 11*b*', 11*c*', 11*d*' are considered to be measured at the imaginary cross-sectional planes A1, A2, A3, A4 of the log W, and the swung angle θ for the contact surface 11*e*' at the imaginary cross-sectional planes A5 and A6, respectively.

For each of the cross-sectional planes A2, A3, A4, A5 which is shared by any two adjacent contact surfaces, the control unit 20 compares the swung angles θ of such two adjacent contact surfaces and selects the angle of a smaller value for storage in memory of the control unit 20. The reason for selecting the smaller value will be described in later part hereof. Accordingly, for the first sectional plane A1, the swung angle of the first contact surface 11*a*' is selected for storage in memory. For the second sectional plane A2, the swung angles of the first and second contact surfaces 11*a*' and 11*b*' are compared and a value determined to be smaller by comparison is selected and stored in memory. Similarly, for the third, fourth and fifth sectional planes A3, A4 and A5, the swung angles of the two adjacent contact surfaces are compared and a value determined as smaller by comparison is selected for storage in memory. For the last sixth plane A6, the swung angle of the fifth contact surface 11*e*' is stored in memory of the control unit 20.

Figure 8:
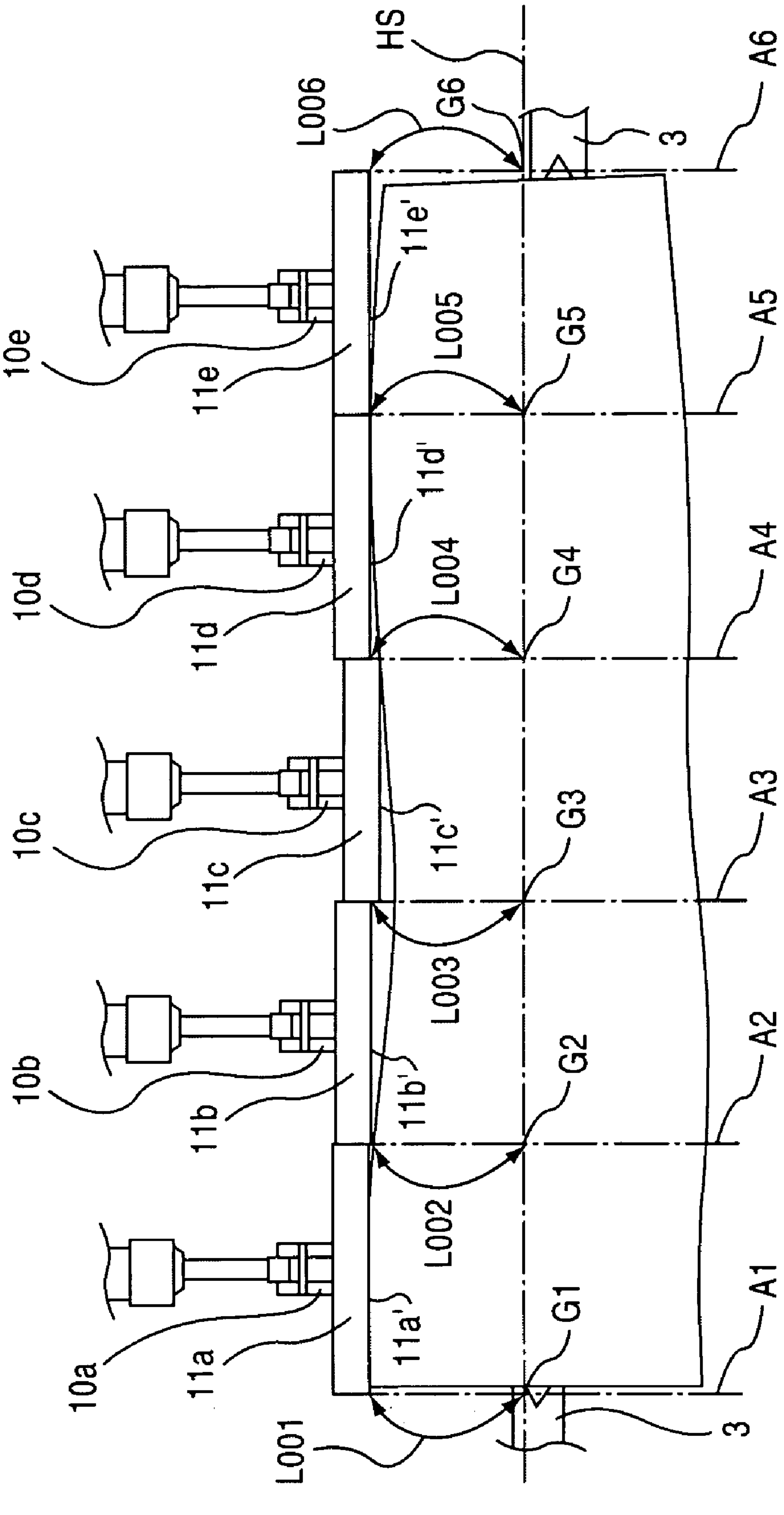
FIG. 8 is a view similar to FIG. 7, but showing an optimum peeling axis of the log.

Then, the control unit 20 computes to figure out a radial distance of the log W from a predetermined location on the computed optimum peeling axis HS to each of those contact surfaces whose swung angles were selected and stored in memory of the control unit 20 for being determined through comparison to be smaller than the angle of the adjacent contact surface. The above predetermined location on the computed optimum peeling axis HS is a point of intersection between the optimum peeling axis HS and each of the respective imaginary cross-sectional planes A1, A2, A3, A4, A5, A6 of the log. As shown in FIG. 8, such predetermined locations on the optimum peeling axis HS are designated by G1, G2, G3, G4, G5 and G6, respectively.

In this case, two different distances are conceivable as the radial distance from a predetermined location on the optimum peeling axis to a selected contact surface. Referring to FIG. 10, in the case of the contact surface 11*a*', one is a radial distance along a line passing through the point G1 and in perpendicular relation to the optimum peeling axis HS, i.e. the distance between G1 and H1, wherein H1 is a point of intersection of the line and the contact surface; while the other is a radial distance along a line passing through the point G1 and in perpendicular relation to the longitudinal axial line 3*b* or to the contact surface 11*a*', i.e. the distance between G1 and H2, wherein H2 is a point of intersection of the line and the contact surface. The former distance G1-H1 is longer than the latter distance G1-H2 and, therefore, represents a more precise maximum diameter of the log W. However, it is rather complicated and hence difficult to compute the dimension of the former distance G1-H1, while the latter distance G1-H2 can be figured out relatively easily. Since the dimensions of these two distances can be considered to be substantially the same in view of the tolerance of errors for component parts of the apparatus, the latter distance G1-H2 may be computed for determining the maximum radius point of the log W. Such radial distances are indicated in FIGS. 8 and 9 by reference symbols L001, L002, L003, L004, L005, L006, respectively.

The following will describe a procedure of calculating the radial distances L001, L002, L003, L004, L005, L006. The following description will be made for the radial distance L001 at the first cross-sectional plane A1 while having reference to FIGS. 8, 9 and 11.

Figure 9:
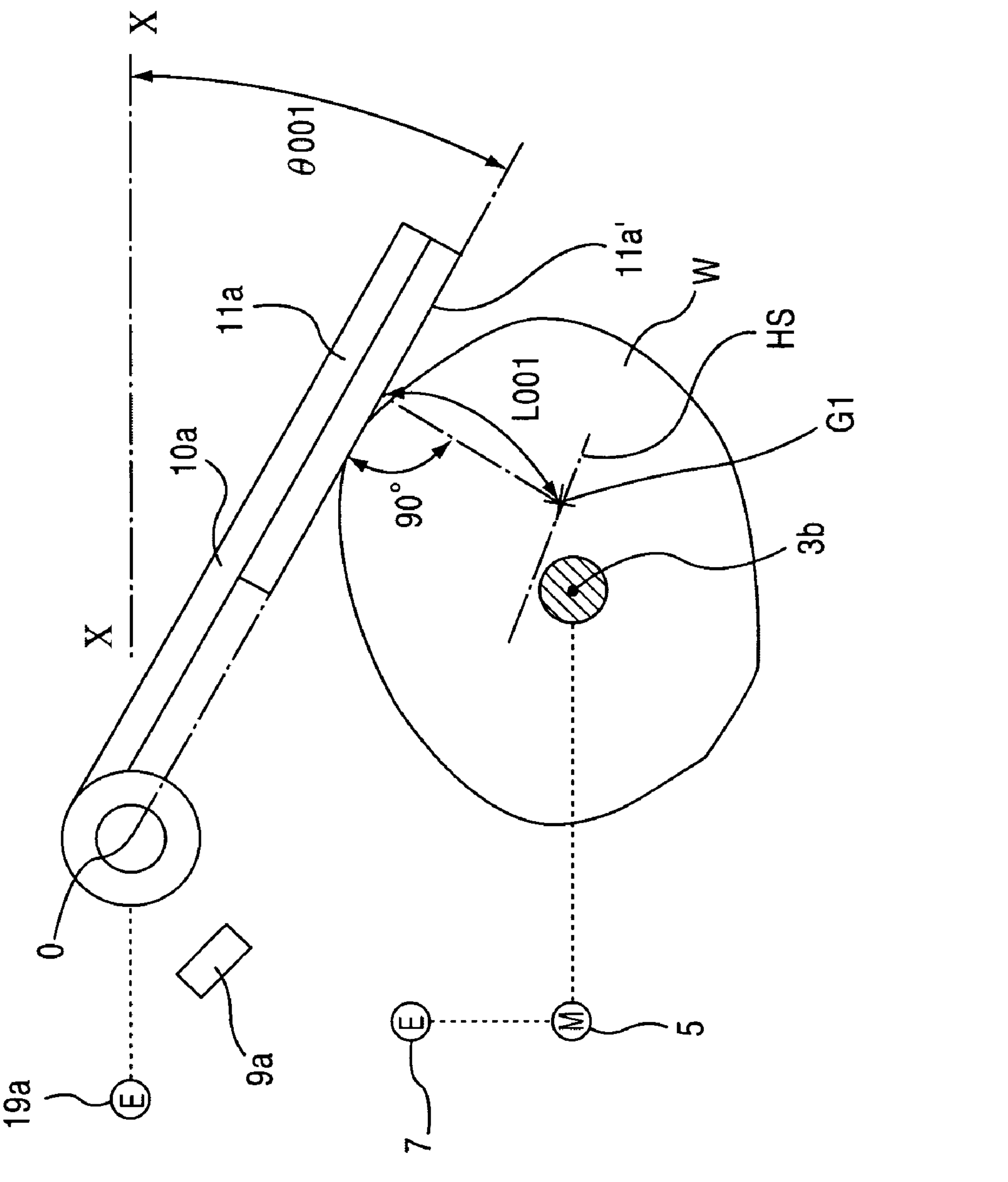
FIG. 9 is a schematic view similar to FIG. 6, showing a distance L001 which is also shown in FIG. 8.
Figure 10:
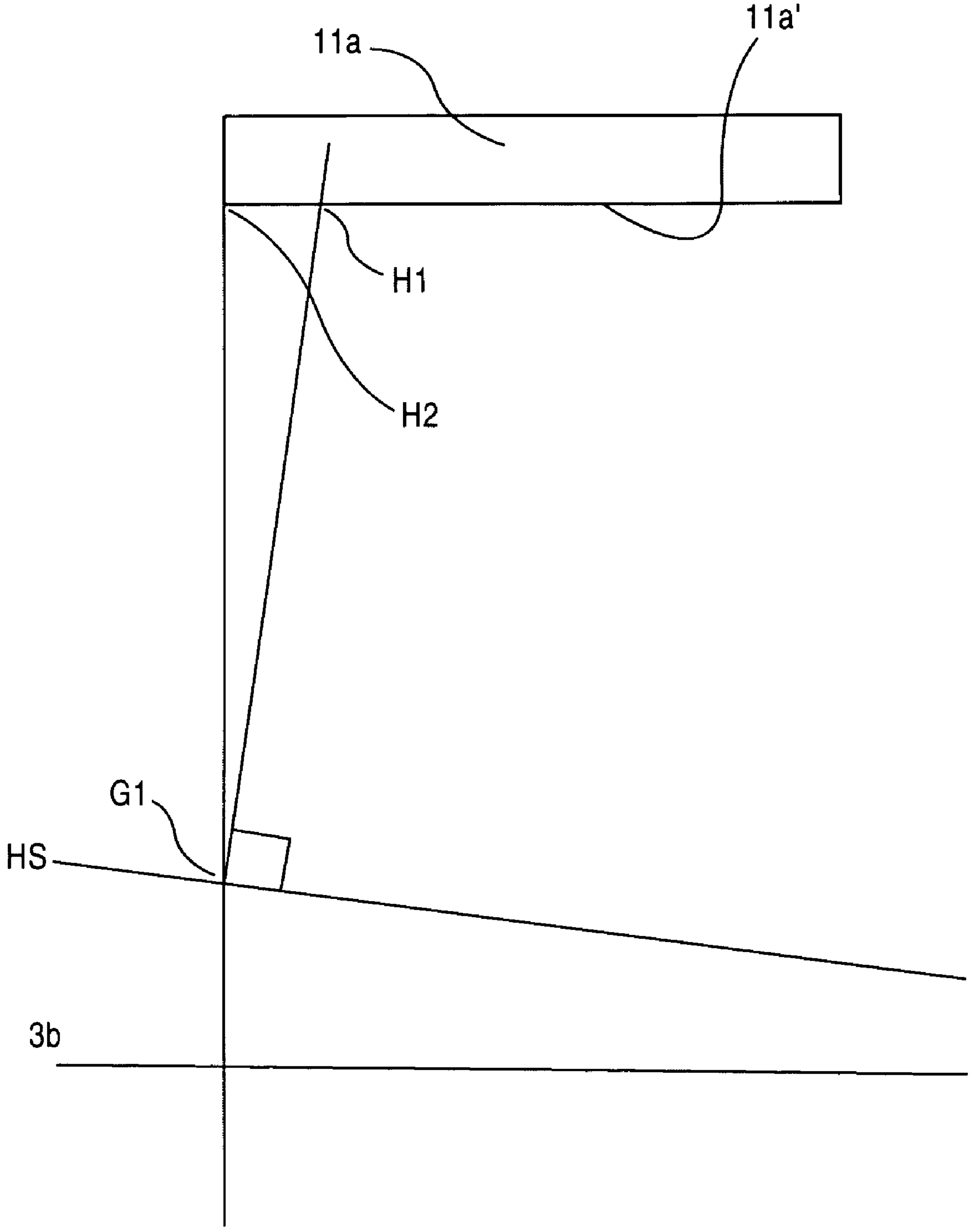
FIG. 10 is a schematic enlarged fragmentary diagram showing part of FIG. 8.

FIG. 11 is a schematic diagram in the cross-sectional plane A1, showing only those lines and angles of FIG. 9 which are necessary for the calculation of the radial distance L001. Therefore, the reference symbols O and X-X, which actually denote a longitudinal axis and a horizontal plane, are used in FIG. 11 for indicating a point O and a line X-X, respectively. In FIG. 11, O-X is a horizontal line extending from line X-X and passing through the point O; O-Y is a line extending in the contact surface 11*a*' and passing through the point O; X1 is the point of intersection between the line O-Y and a line passing through the point G1 in perpendicular relation to the line O-Y; X2 is the point of intersection between the line O-X and a line passing through the point G1 in perpendicular relation to the line O-X; and X3 is the point of intersection between the line G1-X2 and the line O-Y.

Since the optimum peeling axis HS has been already computed in terms of three-dimensional coordinates, the coordinates of the point G1 with reference to a given point on the axis O is computable. In FIG. 11, the distance between the points O and X2 is referred to as T1 and the distance between the points X2 and G1 as T2, as shown by equations (1) and (2), respectively. It is noted that two symbols separated by a middle dot (•) and having a bar at top in some equations denote a distance between two points represented by such symbols and that three symbols separated by similar middle dots signify an angle or a triangle formed by three points represented by such symbols.

Referring again to the schematic diagram of FIG. 11, the distance X2•X3 is expressed by T1×tan θ001, as shown in equation (4). The distance X3•G1 is the difference between the distances X2•G1 and X2•X3, as shown in equation (5), and this may be expressed as T2−T1×tan θ001, as shown in equation (6). The angle X3•G1•X1 is equal to the angle X3•O•X2 which is indicated by θ001, as shown in equations (7) and (8). The value for cos θ001 in the triangle G1•X1•X3 equals to the distance L001 divided by the distance X3•G1, as shown in equation (9). From equation (9), L001 can be expressed by equation (10). Substituting the distance X3•G1 by the right side of the equation (6), L001 can be further expressed by equation (11). As is be now apparent from the foregoing, the value for L001 can be found by substituting actual values for the distances T1, T2 and the angle θ001. The computed value for L001 is stored in memory of the control unit 20.

The control unit 20 performs similar computations for the other radial distances L002, L003, L004, L005 and L006 according to the same procedure of calculation as described above. As mentioned earlier, the control unit 20 compares swung angles of any two adjacent contact surfaces and selects the angle of smaller value for storage in memory. Accordingly, the control unit 20 computes to determine the radial distance L002 from the point G2 to the contact surface 11*a*' whose swung angle is smaller than that of its adjacent contact surface 11*b*' at the cross-sectional plane A2. Similarly, the radial distances L003 from the point G3 to the contact surface 11*b*' whose swung angle is smaller than that of the contact surface 11*c*' at the plane A3 is computed for storage; the radial distances L004 from the point G4 to the contact surface 11*d*' whose swung angle is smaller than that of the contact surface 11*c*' at the plane A4 is computed for storage; and the radial distances L005 from the point G5 to the contact surface 11*d*' whose swung angle is smaller than that of the contact surface 11*e*' at the plane A5 is computed and stored, respectively. At the sixth cross-sectional plane A6, the radial distance L006 from the point G6 to the contact surface 11*e*' is computed.

It is noted that description of a radial distance to a specific contact surface refers not only to a distance directly to the contact surface, but also to a distance to an imaginary extension surface of that contact surface.

Figure 12:
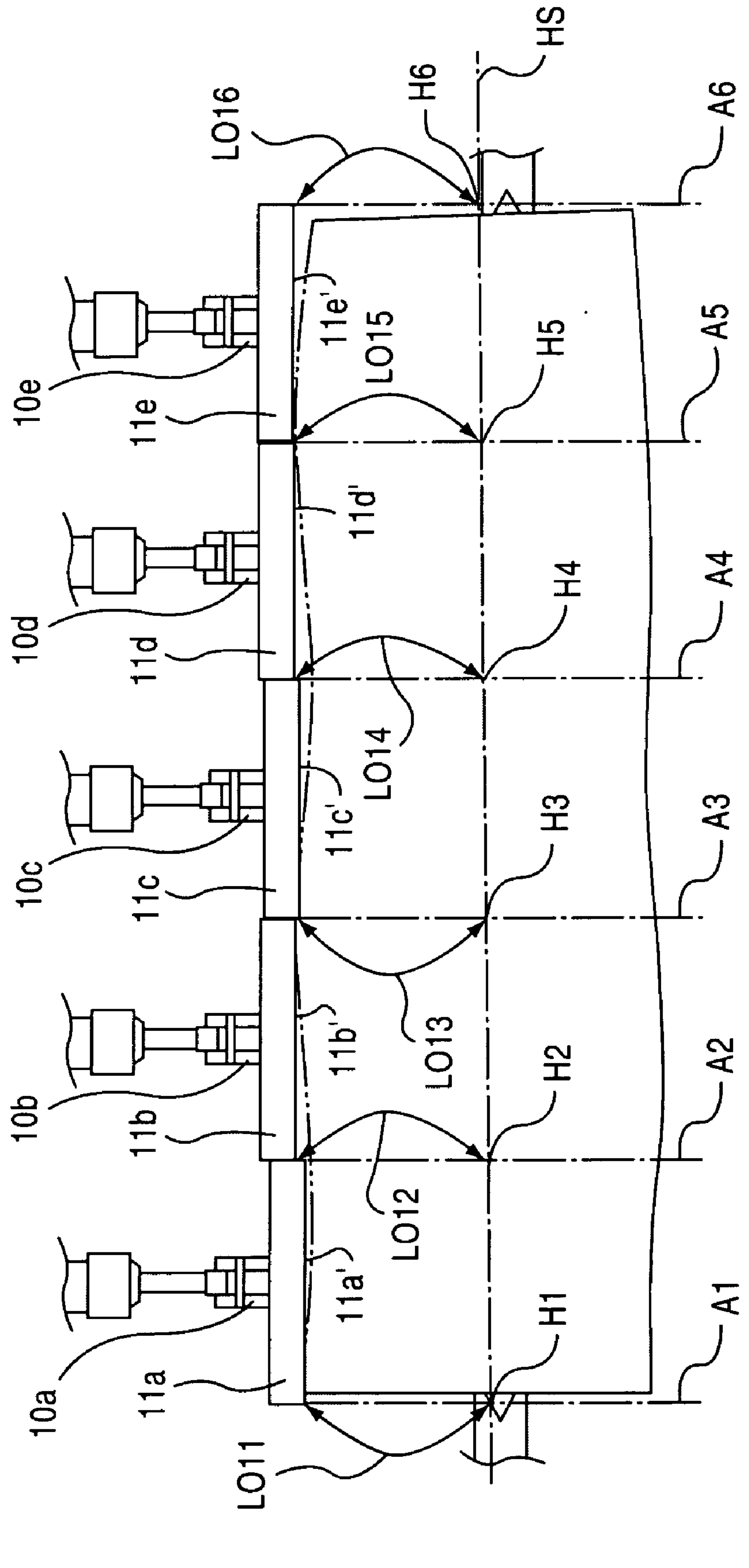
FIG. 12 is a view similar to FIG. 8, but showing a state wherein the log is rotated for a predetermined angular distance from the state of FIG. 8.

Referring to FIG. 12, it shows an example of the positions of the contact surfaces 11*a*', 11*b*', 11*c*', 11*d*', 11*e*' when the log W is rotated by the spindles 3 for a predetermined angle (e.g. 10 degrees) from the position shown in FIG. 8. In FIG. 12, points H1, H2, H3, H4, H5, H6 are the points of intersection between the optimum peeling axis HS and the respective cross-sectional planes A1, A2, A3, A4, A5, A6. Radial distances L011, L012, L013, L014, L015, L016 in FIG. 12, which correspond to the radial distances L001, L002, L003, L004, L005, L006 in FIG. 8, are computed by the control unit 20 using the same procedure of calculation as in the case of FIG. 8, as follows.

The radial distance L011 from the point H1 to the contact surface 11*a*' at the plane A1 is computed and stored in memory. The radial distance L012 from the point H2 to the contact surface 11*b*' whose swung angle is smaller than that of the contact surface 11*a*' at the plane A2 is computed and stored; the radial distances L013 from the point H3 to the contact surface 11*b*' whose swung angle is smaller than that of the contact surface 11*c*' at the plane A3 is computed; the radial distances L014 from the point H4 to the contact surface 11*d*' whose swung angle is smaller than that of the contact surface 11*c*' at the plane A4 is computed; and the radial distances L015 from the point H5 to the contact surface 11*e*' whose swung angle is smaller than that of the contact surface 11*d*' at the sectional plane A5 is computed and stored in memory of the control unit 20, respectively. For the sixth sectional plane A6, the radial distance L016 from the point H6 to the contact surface 11*e*' is computed for storage in memory. Such radial distances are computed by the control unit 20 for the other angular positions of the log W.

For determining the location of the maximum radius point of the log W with respect to the optimum peeling axis HS, the control unit 20 then compares the values in the memory thereof and determines the greatest value as representing the maximum radius point on the log's peripheral surface as measured from the optimum peeling axis HS.

It is to be noted that, while the radial distances L001 through L006 have been computed for locating the maximum radius point, distances from the points G1, G2, G3, G4, G5, G6 to the contact surfaces along lines passing through such points and extending perpendicularly to the optimum peeling axis HS, as referred to in FIG. 10, may be selected for the computation.

After the locations of the optimum peeling axis HS and the maximum radius point of the log W have been thus determined, the knife carriage (not shown) of a rotary veneer lathe (not shown either) is moved relative to lathe spindles (not shown either) and set in the veneer lathe at such a position that the cutting edge of a veneer peeling knife (not shown either) mounted on the knife carriage is spaced from the longitudinal axial line of the lathe spindles at a distance that corresponds to the value of the distance for the maximum radius point of the log W. In view of possible mechanical errors of the veneer lathe, the above spaced distance may be slightly greater than the valve for the maximum radius point.

Then the log W is released from the spindles 3 and transferred to and set in the veneer lathe between the lathe spindles in such a position that the calculated optimum peeling axis HS of the log W coincides with the aligned axes of the lathe spindles. By so doing, when the log W clamped by the lathe spindles is driven to rotate, veneer peeling is initiated after an elapse of a very short time and, therefore, the downtime during which no peeling is performed is minimized and the productivity of the veneer lathe is improved.

Figure 13:
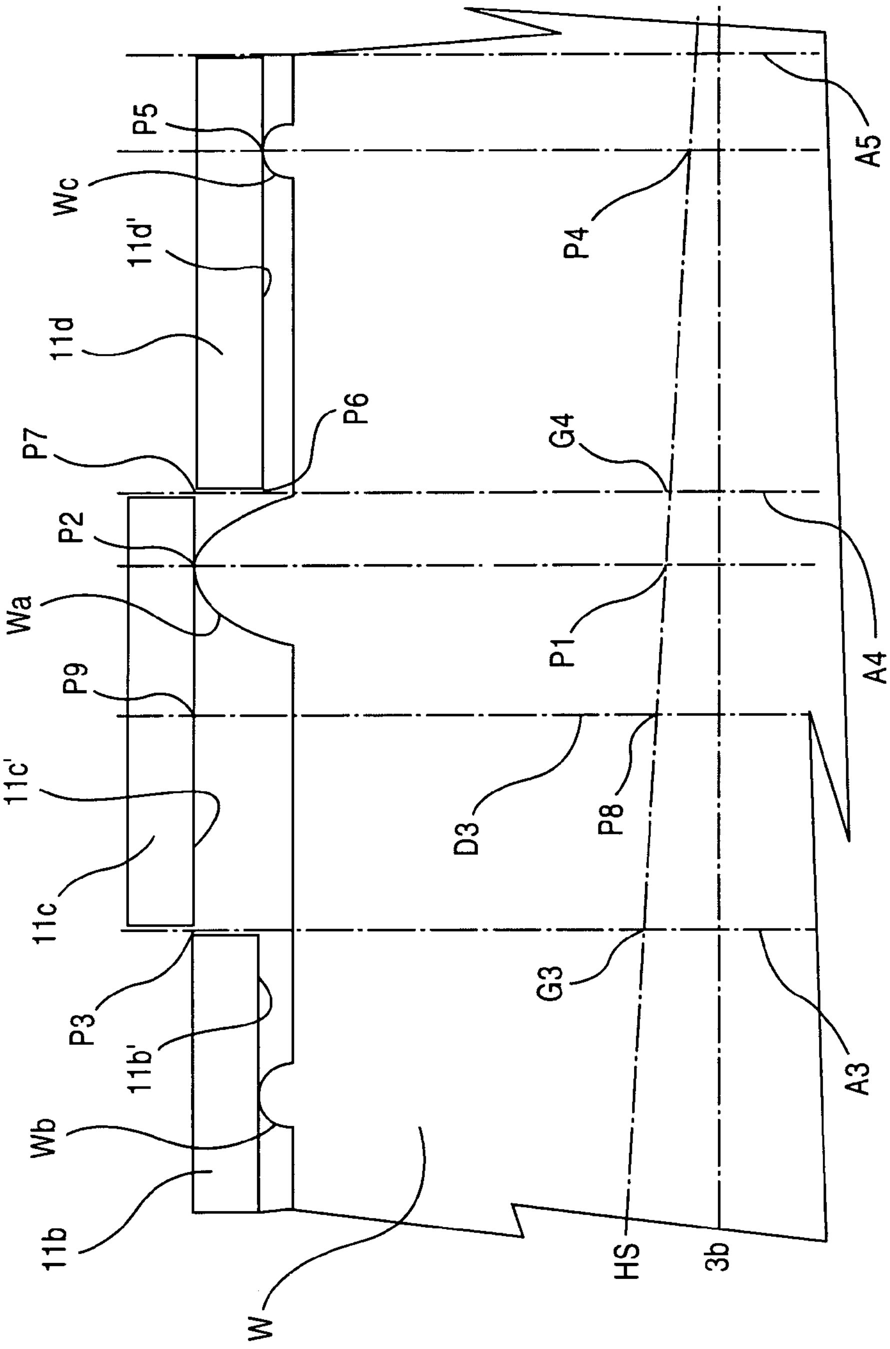
FIG. 13 is a schematic diagram showing part of a log and various projections on the log shown in an exaggerated manner for illustrating a procedure of locating the maximum radius point on the log periphery.

As mentioned earlier in the description with reference to FIGS. 7 and 8, the control unit 20 compares the swung angles of any two adjacent contact surfaces and selects the angle of a smaller value for storage in memory of the control unit 20. The following will explain the reason therefor while having reference to FIG. 13 which is a schematic diagram showing a part of a log W and three contact plates 11*b*, 11*c*, 11*d* with the contact surfaces 11*b*', 11*c*', 11*d*'. For the ease of understanding, the surface irregularities of the log W are represented by the presence of three exaggerated projections Wa, Wb and Wc. As seen in FIG. 13, these projections Wa, Wb and Wc are in contact with the contact surfaces 11*c*', 11*b*' and 11*d*', respectively.

In FIG. 13, P2 is a point of contact between the projection Wa and the contact surface 11*c*'; P1 is a point of intersection between the optimum peeling axis HS and a vertical plane extending in parallel, e.g. to the cross-sectional plane A4 and passing through the point P2; P3 is a point of intersection between the contact surface 11*c*' and a line passing through the point G3 and in perpendicular relation to the contact surface 11*c*'; P5 is a point of contact between the projection Wc and the contact surface 11*d*'; P4 is a point of intersection between the optimum peeling axis HS and a vertical plane extending in parallel, e.g. to the cross-sectional plane A5 and passing through the point P5; P6 is a point of intersection between the contact surface 11*d*' and a line passing through the point G4 and in perpendicular relation to the contact surface 11*d*'; and P7 is a point of intersection between the contact surface 11*c*' and a line passing through the point G4 and in perpendicular relation to the contact surface 11*c*'.

As seen in FIG. 13, the contact surface 11*c*' is located furthest from the preliminary axis 3*b* of the log W in the drawing because of the presence of the projection Wa on the log W. Although it cannot be recognized from information provided by the rotary encoders which part of the contact surface 11*c*' is actually in contact with projection Wa on the log W, it is presumed for the sake of the description that the projection Wa is in contact with the contact surface 11*c*' at a location that is close to the right side of the contact plate 11*c* and also that the computed optimum peeling axis HS extends declining rightward as shown in 12. In such a case, if the swung angle of each contact surface is taken at a position of the log W corresponding to the left side thereof, i.e. at the cross-sectional plane A3 for the contact surface 11*c*' and at the cross-sectional plane A4 for the contact surface 11*d*', a problem occurs as follow.

That is, the distance from the optimum peeling axis HS to the contact surfaces 11*c*', or the distance between the points G3 and P3 at the plane A3 as calculated according to the procedure described with reference to FIG. 11 will be regarded as having the maximum value for the section of the log W that corresponds to the contact surface 11*c*' in spite that this distance is smaller than the distance between the points P1 and P2, as clearly seen from FIG. 13. The same is true of the distance between the points G4 and P6 that is smaller the distance between the points P4 and P5 for the section of the log W that corresponds to the contact surface 11*d*'.

If the distance between the points G3 and P3 is regarded as the point for the maximum radius of the log W and the knife carriage is set with the cutting edge of the veneer peeling knife spaced from the axial line of the lathe spindles based on such information, the projection Wa will collide against the knife on the knife carriage when the log W is rotated, thereby inviting a breakage not only to the knife but also to any other part of the veneer lathe. As would be now apparent, when the space between the computed optimum peeling axis HS and any contact surface (e.g. the contact surface 11*c*') is widened away from the location (or the plane A3 in the case of the contact surface 11*c*') which was selected as the location for calculation of the distance based on the swung angle of the contact surface as in the case shown in FIG. 13, the computed distance between the optimum peeling axis HS and contact surface is smaller than the spaced distance from the same axis HS to point P2 of the projection Wa. If the maximum radius point is thus determined, harmful collision of the log W with the knife may occur during the first rotation of the log W.

If the computed optimum peeling axis HS extends declining leftward as viewed in 12 and the swung angle of the swing arm is taken at a position corresponding to the right side of each contact surface, on the other hand, the same problem as described above will take place.

To forestall such selection of a wrong distance for the maximum radius point on the log W, the control unit 20 is operable to compare angles swung by any two adjacent contact surfaces and selects the angle of a smaller value for calculation of a distance between the computed optimum peeling axis and the contact surface. In the case of FIG. 13, at the cross-sectional plane A3, the swung angle of the contact surface 11*c*' that is smaller than that of its adjacent contact surface 11*b*' is selected for calculation of the distance between the optimum peeling axis and the contact surface. Similarly, at the plane A4, the swung angle of the contact surface 11*c*' that is smaller than that of its adjacent contact surface 11*d*' is selected for the same purpose. Accordingly, within the range of the log W shown in FIG. 13, distances between the points G3 and P3 and the points G4 and P7 are computed on the basis the swung angle of the contact surface 11*c*' for comparison and the larger distance between the points G4 and P7 is selected as the distance representing the maximum radius point on the log peripheral surface. In this case, the distance between the points G4 and P7 is larger than the distance between the points P1 and P2 that represents the actual maximum radius point of the log W and, therefore, the veneer knife on the carriage will be set slightly further than the optimum position, with the result that a longer time is spent before veneer peeling begins. However, such extension of time is negligible.

In the above-described embodiment, the control unit 20 has operated to figure out the angle θ swung by the contact surface, i.e. the angle θ then made between the horizontal plane X-X and the plane of the contact surfaces, on the basis of information of the angular position provided by the rotary encoders. For understanding the present invention, however, it is important to note that what determines the dimension of a radial distance, e.g. L001, is not the angle of a contact surface relative to the arbitrary standby position X-X, but the angle of that contact surface relative to the reference position that is defined by an imaginary plane passing through the fixed axes 3*b* and O. Therefore, the control unit 20 may be operable to figure out an angle made between the contact surface and the reference position on the basis of information of angular position of the contact surface and also to compare such angles of any two adjacent contact surfaces. The angle between the contact surface and the reference position can be found easily merely by subtracting the angle θ from the known angle made between the reference position and the horizontal plane X-X. In computing to figure out a radial distance, e.g. L001, therefore, θ001 may be substituted by the difference between angle made between the reference position and the horizontal plane X-X and the angle θ in equation (11), i.e. L001=(T2−T1×tan θ001)×cos θ001.

Although the foregoing has described the present invention by way of a specific embodiment, it is to be understood that the present invention is not limited to the illustrated embodiment, but it can be practiced in other various changes and modifications, as exemplified below.

Imaginary cross-sectional planes of a log W, such as A1, A2 and so forth in FIG. 7, may be set at the center of width of the respective contact surfaces, as indicated by an imaginary cross-sectional plane D3 for the third contact surface 11*c*' shown in FIG. 13. In this case, P8 designates the point of intersection between the imaginary cross-sectional plane D3 and the optimum peeling axis HS, and point P9 denotes the point of intersection between the contact surface 11*c*' and an imaginary line extending through the point P8 and perpendicularly to the contact surface 11*c*'. Distance between the points P8 and P9 can be found by substituting the swung angle of the contact surface 11*c*' for θ001 in equation (11) of FIG. 11. As apparent from FIG. 13, the point P8 is different from the points G3 and G4 on the optimum peeling axis HS which is computed in three-dimensional coordinates and, therefore, actual values for T1 and T2 need be figured out for substitution in equation (11). Though the distance between the points P8 and P9 is shorter than the distance between the points P1 and P2, error in the maximum radius point of the log is advantageously smaller than in the case where the distance between the points G3 and P3 is selected for the maximum radius point. To deal with such error, the knife carriage may be set relative to the lathe spindles such that the cutting edge of veneer peeling knife is spaced from the longitudinal axial line of the lathe spindles at a distance that is slightly greater than the valve for the computed maximum radius point.

If a peeler log has a peripheral profile which is approximate to a circular cylinder, the calculation procedure may be simplified as follows. At each of the equiangularly spaced positions of the log W, angles swung by the respective contact surfaces 10*a*, 10*b*, 10*c*, 10*d*, 10*e* are compared and the smallest angle is selected. Then, on the basis of such selected angles, distances from the optimum peeling axis HS to the respective contact surfaces along a line extending perpendicularly to the contact surface are computed. Of all such computed distances, the largest distance is taken as the distance for the maximum radius of the log. This simplified calculation helps to shorten the time for the calculation.

Though all contact surfaces 11*a*', 11*b*', 11*c*', 11*d*', 11*e*' in the preferred embodiment have substantially the same width extending along the axis O of the support shaft 13 as shown, e.g. in FIG. 3, it may be so arranged that two contact surfaces 11*a*' and 11*e*' located on the opposite sides are smaller in width than the other contact surfaces 11*b*', 11*c*' and 11*d*'. By so arranging the contact surfaces, though the detailed description will be omitted, accuracy in determining the location of the maximum radius point of a log can be improved.

In the preferred embodiment, the contact surfaces 11*a*', 11*b*', 11*c*', 11*d*', 11*e*' are swung into contact with the peripheral surface of the log W after it has been held by the spindles 3. According to the present invention, however, the contact surfaces may be moved into contact with the log periphery before it is held by the spindles or substantially simultaneously with the holding by the spindles.

Though, according to the preferred embodiment, the laser devices 9*a*, 9*b*, 9*c* and the rotary encoders 19*a*, 19*b*, 19*c*, 19*d*, 19*e* are operable to make measurements simultaneously for the distances and the angles, respectively, at each of the equiangularly spaced positions of the spindle 3 or the log W, the laser devices and the rotary encoders may be operated independently at different angularly spaced positions of the log W.

What is claimed is:

1. A method for locating an optimum peeling axis of a log and a maximum radius point on a peripheral surface of the log with respect to said optimum peeling axis on the basis of information of a peripheral profile of the log which is rotated about a preliminary axis thereof for at least one complete turn, comprising the steps of:

computing an optimum peeling axis of the log on the basis of radial distances of the log from said preliminary axis to the peripheral surface of the log at a plurality of predetermined locations spaced along said preliminary axis of the log at each of a plurality of predetermined angularly spaced positions of the log;

providing a plurality of swingable members which are pivotally mounted on a shaft having a longitudinal axis extending in parallel with said preliminary axis of the log and having flat contact surfaces each having a width extending along said longitudinal axis, each of said contact surfaces being swingable with the swingable member relative to a reference position which is defined by an imaginary plane extending through said preliminary axis and said longitudinal axis while in contact with the peripheral surface of the log thereby to follow the peripheral profile of the log being rotated about said preliminary axis;

measuring an angular position of the contact surface of each swingable member with respect to said reference position at each of said predetermined angularly spaced positions of the log by said swingable member;

computing radial distances of the log from a plurality of predetermined locations on said computed optimum peeling axis to selected contact surfaces along imaginary lines extending perpendicularly to said preliminary axis on the basis of the measured angular positions of the contact surfaces; and comparing said computed radial distances and recognizing the distance having the greatest value as the maximum radius point of the log.

2. The method according to claim 1, wherein said predetermined locations on the computed optimum peeling axis are points of intersection between said optimum peeling axis and respective imaginary planes extending across the log at a side of the width of the contact surfaces in perpendicular relation to said preliminary axis of the log.

3. The method according to claim 2, further comprising comparing angles of any two adjacent contact surfaces with respect to said reference position on the basis of the angular positions of such two adjacent contact surfaces measured at each of said predetermined angularly spaced positions of the log, wherein said selected contact surfaces include one of said two adjacent contact surfaces whose angle with respect to said reference position is greater than that of the other of said two adjacent contact surfaces.

4. The method according to claim 1, wherein said predetermined locations on the computed optimum peeling axis are points of intersection between said optimum peeling axis and respective imaginary planes extending across the log at a substantial center of the width of the contact surfaces in perpendicular relation to said preliminary axis of the log, and wherein said selected contact surfaces include all contact surfaces.

5. A method for locating an optimum peeling axis of a log and a maximum radius point on a peripheral surface of the log with respect to said optimum peeling axis on the basis of information of a peripheral profile of the log which is rotated about a preliminary axis thereof for at least one complete turn, comprising the steps of:

computing an optimum peeling axis of the log on the basis of radial distances of the log from said preliminary axis to the peripheral surface of the log at a plurality of predetermined locations spaced along said preliminary axis of the log at each of a plurality of predetermined angularly spaced positions of the log;

providing a plurality of swingable members which are pivotally mounted on a shaft having a longitudinal axis extending in parallel with said preliminary axis of the log and having flat contact surfaces each having a width extending along said longitudinal axis, each of said contact surfaces being swingable with the swingable member relative to a reference position which is defined by an imaginary plane extending through said preliminary axis and said longitudinal axis while in contact with the peripheral surface of the log thereby to follow the peripheral profile of the log being rotated about said preliminary axis;

measuring an angular position of the contact surface of each swingable member with respect to said reference position at each of said predetermined angularly spaced positions of the log by said swingable member;

computing radial distances of the log from a plurality of predetermined locations on said computed optimum peeling axis to selected contact surfaces along imaginary lines extending perpendicularly to said computed optimum peeling axis on the basis of the measured angular positions of the contact surfaces; and comparing said computed radial distances and recognizing the distance having the greatest value as the maximum radius point of the log.

6. The method according to claim 5, wherein said predetermined locations on the computed optimum peeling axis are points of intersection between said optimum peeling axis and respective imaginary planes extending across the log at a side of the width of the contact surfaces in perpendicular relation to said preliminary axis of the log.

7. The method according to claim 6, further comprising comparing angles of any two adjacent contact surfaces with respect to said reference position on the basis of the angular positions of such two adjacent contact surfaces measured at each of said predetermined angularly spaced positions of the log, wherein said selected contact surfaces include one of said two adjacent contact surfaces whose angle with respect to said reference position is greater than that of the other of said two adjacent contact surfaces.

8. The method according to claim 5, wherein said predetermined locations on the computed optimum peeling axis are points of intersection between said optimum peeling axis and respective imaginary planes extending across the log at a substantial center of the width of the contact surfaces in perpendicular relation to said preliminary axis of the log.

9. An apparatus for locating an optimum peeling axis of a log and a maximum radius point on a peripheral surface of the log with respect to said optimum peeling axis, comprising:

a pair of spindles for holding therebetween a log at a preliminary axis thereof;

a drive for driving at least one of said paired spindles thereby to rotate the log about said preliminary axis for at least one complete turn;

a first sensor for detecting a plurality of angularly spaced positions of at least one of said spindles and the log;

a plurality of swingable members which are swingably mounted on a shaft having a longitudinal axis extending in parallel with said preliminary axis of the log and having flat contact surfaces each having a width extending along said longitudinal axis, each of said contact surfaces being swingable with the swingable member relative to a reference position which is defined by an imaginary plane extending through said preliminary axis and said longitudinal axis while in contact with the peripheral surface of the log thereby to follow the peripheral profile of the log being rotated about said preliminary axis;

a plurality of second sensors arranged at a spaced interval along said preliminary axis of the log for measuring distances from the respective second sensors to the peripheral surface of the log at each of said angularly spaced positions of the log;

a plurality of third sensors operable in conjunction with said swingable members to measure angular positions of the contact surfaces with respect to said reference position at each of said angularly spaced positions of the log; and control means operable to compute the optimum peeling axis of the log on the basis of said distances measured by said second sensors, said control means being further operable to compute radial distances of the log from a plurality of predetermined locations on said computed optimum peeling axis to selected contact surfaces along imaginary lines extending perpendicularly to said preliminary axis of the log on the basis of the measured angular positions of the contact surfaces, and to compare said computed radial distances and then to recognize the distance having the greatest value as the maximum radius point of the log.

10. The apparatus according to claim 9, wherein said predetermined locations on the computed optimum peeling axis are points of intersection between said optimum peeling axis and respective imaginary planes extending across the log at a side of the width of the contact surfaces in perpendicular relation to said preliminary axis of the log.

11. The apparatus according to claim 10, wherein said control means is operable to compare angles of any two adjacent contact surfaces with respect to said reference position on the basis of the angular positions of such two adjacent contact surfaces measured at each of said predetermined angularly spaced positions of the log, wherein said selected contact surfaces include one of said two adjacent contact surfaces whose angle with respect to said reference position is greater than that of the other of said two adjacent contact surfaces.

12. The apparatus according to claim 9, wherein said predetermined locations on the computed optimum peeling axis are points of intersection between said optimum peeling axis and respective imaginary planes extending across the log at a substantial center of the width of the contact surfaces in perpendicular relation to said preliminary axis of the log, and wherein said selected contact surfaces include all contact surfaces.

13. The apparatus according to claim 9, said third sensor includes a rotary encoder.

14. An apparatus for locating an optimum peeling axis of a log and a maximum radius point on peripheral surface of the log with respect to said optimum peeling axis, comprising:

a pair of spindles for holding therebetween a log at a preliminary axis thereof;

a drive for driving at least one of said paired spindles thereby to rotate the log about said preliminary axis for at least one complete turn;

a first sensor for detecting a plurality of angularly spaced positions of at least one of said spindles and the log;

a plurality of swingable members which are swingably mounted on a shaft having a longitudinal axis extending in parallel with said preliminary axis of the log and having flat contact surfaces each having a width extending along said longitudinal axis, each of said contact surfaces being swingable with the swingable member relative to a reference position which is defined by an imaginary plane extending through said preliminary axis and said longitudinal axis while in contact with the peripheral surface of the log thereby to follow the peripheral profile of the log being rotated about said preliminary axis;

a plurality of second sensors arranged at a spaced interval along said preliminary axis of the log for measuring distances from the respective second sensors to the peripheral surface of the log at each of said angularly spaced positions of the log;

a plurality of third sensors operable in conjunction with said swingable members to measure angular positions of the contact surfaces with respect to said reference position at each of said angularly spaced positions of the log; and control means operable to compute the optimum peeling axis of the log on the basis of said distances measured by said second sensors, said control means being further operable to compute radial distances of the log from a plurality of predetermined locations on said computed optimum peeling axis to selected contact surfaces along imaginary lines extending perpendicularly to said computed optimum peeling axis on the basis of the measured angular positions of the contact surfaces, and to compare said computed radial distances and then to recognize the distance having the greatest value as the maximum radius point of the log.

15. The apparatus according to claim 14, wherein said predetermined locations on the computed optimum peeling axis are points of intersection between said optimum peeling axis and respective imaginary planes extending across the log at a side of the width of the contact surfaces in perpendicular relation to said preliminary axis of the log.

16. The apparatus according to claim 15, wherein said control means is operable to compare angles of any two adjacent contact surfaces with respect to said reference position on the basis of the angular positions of such two adjacent contact surfaces measured at each of said predetermined angularly spaced positions of the log, wherein said selected contact surfaces include one of said two adjacent contact surfaces whose angle with respect to said reference position is greater than that of the other of said two adjacent contact surfaces.

17. The apparatus according to claim 14, wherein said predetermined locations on the computed optimum peeling axis are points of intersection between said optimum peeling axis and respective imaginary planes extending across the log at a substantial center of the width of the contact surfaces in perpendicular relation to said preliminary axis of the log, and wherein said selected contact surfaces include all contact surfaces.

18. The apparatus according to claim 14, wherein said third sensor includes a rotary encoder.

* * * * *